US007330179B2

(12) United States Patent
Endo et al.

(10) Patent No.: US 7,330,179 B2
(45) Date of Patent: Feb. 12, 2008

(54) DISPLAY DEVICE AND DRIVING METHOD THEREOF

(75) Inventors: Masami Endo, Kanagawa (JP); Jun Koyama, Kanagawa (JP); Toshihiko Saito, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 571 days.

(21) Appl. No.: 10/688,259

(22) Filed: Oct. 20, 2003

(65) Prior Publication Data

US 2004/0090404 A1 May 13, 2004

(30) Foreign Application Priority Data

Oct. 21, 2002 (JP) ............................ 2002-306426

(51) Int. Cl.
*G06F 3/038* (2006.01)

(52) U.S. Cl. ........................................ 345/204; 345/98

(58) Field of Classification Search .................. 345/88, 345/98, 99, 213, 539, 534, 535, 204
See application file for complete search history.

(56) References Cited

U.S. PATENT DOCUMENTS 5,572,691 A * 11/1996 Koudmani ..................... 711/5
5,990,629 A 11/1999 Yamada et al. .......... 315/169.3
6,025,822 A 2/2000 Motegi et al. ................ 345/98
6,222,515 B1 4/2001 Yamaguchi et al. .......... 345/89
6,225,990 B1 * 5/2001 Aoki et al. ................. 345/204
6,611,108 B2 8/2003 Kimura
7,199,834 B2 * 4/2007 Fujii et al. .................. 348/521
2001/0035849 A1 11/2001 Kimura et al.
2001/0035863 A1 11/2001 Kimura
2002/0024508 A1 2/2002 Nakamura et al.
2003/0174153 A1 9/2003 Koyama

FOREIGN PATENT DOCUMENTS

| | | | |
|---|---|---|---|
| EP | 0 484 159 | A2 | 5/1992 |
| EP | 1 094 438 | A1 | 4/2001 |
| JP | 04-116688 | | 4/1992 |
| JP | 04-291395 | | 10/1992 |
| JP | 05-072998 | | 3/1993 |
| JP | 2001-343924 | | 12/2001 |
| JP | 2002-006808 | | 1/2002 |
| JP | 2002-014653 | | 1/2002 |
| WO | WO 98/33165 | | 7/1998 |

OTHER PUBLICATIONS

International Search Report (Application No. PCT/JP03/13069) dated Nov. 18, 2003 (7 pages).

* cited by examiner

*Primary Examiner*—Amr A. Awad
*Assistant Examiner*—Steven E Holton
(74) *Attorney, Agent, or Firm*—Fish & Richardson P.C.

(57) ABSTRACT

Regarding the time gradation method as the digital gradation expression method, it is an object of the invention to provide a display device which prevents a reduction of frame frequency and implements a low-power-consumption SRAM. The invention overcomes the aforementioned disadvantages of conventional technique by synchronizing a writing and reading by utilizing read and write signals of which states read at a certain timing to select which of two memories is efficient to be written.

7 Claims, 13 Drawing Sheets

PRIOR ART

PRIOR ART

PRIOR ART

DISPLAY DEVICE AND DRIVING METHOD THEREOF

BACKGROUND OF THE INVENTION

1. Field of the Invention

The invention relates to a display device, and more particularly such a display device having a light emitting element and a memory control circuit. The memory control circuit controls a writing and reading to memories such as SRAM.

2. Description of the Related Art

Hereinafter explained is a display device which disposes a light emitting element at each pixel and displays an image by controlling the emission of the light emitting elements.

The explanation throughout this specification uses elements (OLED elements) having a structure in which an organic compound layer for emitting light when an electric field is generated is sandwiched between an anode and a cathode, for the light emitting elements, but the present invention is not limited to this structure.

Further, the explanation within this specification uses elements that utilize light emitted when making a transition from singlet excitons to a base state (fluorescence), and those that utilize light emitted when making a transition from triplet excitons to a base state (phosphorescence).

An organic compound layer includes a hole injection layer, a hole transporting layer, a light emitting layer, an electron transporting layer, an electron injection layer, and the like. The basic structure of a light emitting element is a laminate of an anode, a light emitting layer, and a cathode layered in this order. The basic structure can be modified into a laminate of an anode, a hole injection layer, a light emitting layer, an electron injection layer, and a cathode layered in this order, or a laminate of an anode, a hole injection layer, a hole transporting layer, a light emitting layer, an electron transporting layer, an electron injection layer, and a cathode layered in this order.

A display device is constituted by a display and peripheral circuits for inputting signals to the display.

The structure of the display is shown in a block diagram of FIG. 8.

In FIG. 8, the display 2000 is constituted by a source signal line driver circuit 2107, a gate signal line driver circuit 2108, and a pixel portion 2109. The pixel portion has pixels disposed in a matrix shape.

Thin film transistors (hereafter referred to as TFTs) are arranged in each pixel. A method of placing two TFTs in each pixel and controlling light emitted from the light emitting element of each pixel is explained.

FIG. 9 shows a structure of a pixel portion of a display device.

Source signal lines S1 to Sx, gate signal lines G1 to Gy, and electric power source supply lines V1 to Vx are arranged in a pixel portion 2700, and x columns and y rows (where x and y are natural numbers) of pixels are also placed in the pixel portion. Each pixel 2705 has a switching TFT 2701, a driver TFT 2702, a storage capacitor 2703, and a light emitting element 2704.

The pixel is constituted by one source signal line S of the source signal lines S1 to Sx, one gate signal line G of the gate signal lines G1 to Gy, one electric power source supply line V of the electric power source supply lines V1 to Vx, the switching TFT 2701, the driver TFT 2702, the storage capacitor 2703, and the light emitting element 2704.

A gate electrode of the switching TFT 2701 is connected to the gate signal line G, and either a source region or a drain region of the switching TFT 2701 is connected to the source signal line S, while the other is connected to a gate electrode of the driver TFT 2702 and to one electrode of the storage capacitor 2703. Either a source region or a drain region of the driver TFT 2702 is connected to the electric power source supply line V, while the other is connected to an anode or a cathode of the light emitting element 2704. The electric power source supply line V is connected to one of the two electrodes of the storage capacitor 2703, namely the electrode on a side to which the driver TFT 2702 and the switching TFT 2701 are not connected.

The anode of the light emitting element 2704 is referred to as a pixel electrode, and the cathode of the light emitting element 2704 is referred to as an opposing electrode, within this specification for cases in which the source region or the drain region of the driver TFT 2702 is connected to the anode of the light emitting element 2704. On the other hand, if the source region or the drain region of the driver TFT 2702 is connected to the cathode of the light emitting element 2704, then the cathode of the light emitting element 2704 is referred to as the pixel electrode, and the anode of the light emitting element 2704 is referred to as the opposing electrode.

Further, an electric potential imparted to the electric power source supply line V is referred to as an electric power source electric potential, and an electric potential imparted to the opposing electrode is referred to as an opposing electric potential.

The switching TFT 2701 and the driver TFT 2702 may be either p-channel TFTs or n-channel TFTS. However, it is preferable that the driver TFT 2702 is a p-channel TFT, and that the switching TFT 2701 is an n-channel TFT for cases in which the pixel electrode of the light emitting element 2704 is the anode. Conversely, it is preferable that the driver TFT 2702 is an n-channel TFT, and that the switching TFT 2701 is a p-channel TFT if the pixel electrode is the cathode.

Operations during display of an image with the aforementioned pixel structure are explained below.

A signal is inputted to the gate signal line G, and the electric potential of the gate electrode of the switching TFT 2701 changes, then a gate voltage is changed. The signal is inputted to the gate electrode of the driver TFT 2702 by the source signal line S, via source and drain of the switching TFT 2701 which thus has been placed in a conductive state. Further, the signal is stored in the storage capacitor 2703. The gate voltage of the driver TFT 2702 changes in accordance with the signal inputted to the gate electrode of the driver TFT 2702, then the source and drain are placed in a conductive state. The electric potential of the electric power source supply line V is imparted to the pixel electrode of the light emitting element 2704 through the driver TF 2702. The light emitting element 2704 thus emits light.

A method of expressing gradations with pixels having such a structure is explained. Gradation expression methods can be roughly divided into an analog method and a digital method. The digital method has advantages of being good at variation of TFTs compared with the analog method. A digital gradation expression method is focused upon here. A time gradation method can be given as the digital gradation expression method. A time gradation driving method is explained in detail now.

The time gradation driving method is a method of expressing gradations by controlling the period that each pixel of a display device emits light. If a period for displaying one image is taken as one frame period, then one frame period is divided into a plurality of subframe periods.

Turn on and turn off, namely whether or not the light emitting element of each pixel is made to emit light or to not emit light, is performed for each subframe period. The period during which the light emitting element emits light in one frame period is controlled, and a gradation for each pixel is expressed.

The time gradation driving method is explained in detail using timing charts of FIGS. 10A and 10B. Note that an example of expressing gradation using a 4-bit digital image signal is shown in FIGS. 10A and 10B. Note also that FIG. 9 may be referred to regarding the structure of the pixel portion and the structure of the pixels, respectively. In accordance with an external electric power source (not shown in the figure), the opposing electric potential can be switched over between an electric potential on the same order as the electric potential of the electric power source supply lines V1 to Vx (electric power source electric potential), and an electric potential difference of the electric power source supply lines V1 to Vx on an order sufficient to make the light emitting element 2704 emit light.

One frame period F is divided into a plurality of subframe periods SF1 to SF4. The gate signal line G1 is selected first in the first subframe period SF1, and a digital image signal is inputted from the source signal lines S1 to Sx to each of the pixels having the switching TFTs 2701 with gate electrodes connected to the gate signal line G1. The driver TFT 2702 of each pixel is placed in an ON state or an OFF state by the inputted digital image signal.

The term "ON state" for a TFT in this specification indicates that the TFT is in a state in which there is a state of conduction between the source and the drain in accordance with a gate voltage. Further, the term "OFF state" for a TFT indicates that there is a non-conductive state between the source and the drain in accordance with a gate voltage.

The opposing electric potential of the light emitting elements 2704 is set nearly equal to the electric potential of the electric power source supply lines V1 to Vx (electric power source electric potential) at this point, and therefore the light emitting elements 2704 do not emit light even in pixels having their driver TFT 2702 in an ON state. The aforementioned operations are repeated for all of the gate signal lines G1 to Gy, and a write-in period Ta1 is completed. Note that a period for write-in during the first subframe period SF1 is called Ta1. In general, a write-in period of a j-th sub-frame period (where j is a natural number) is called Taj.

The opposing electric potential changes when the write-in period Ta1 is complete, so as to have an electric potential difference from the electric power source electric potential on an order so that the light emitting element 2704 will emit light. A display period Ts1 thus begins. Note that the display period of the first subframe period SF1 is called Ts1. In general, a display period of the j-th sub-frame period (where j is a natural number) is denoted by using a reference symbol Tsj. The light emitting elements 2704 of each pixel are placed in a light emitting state or a non-light emitting state, corresponding to the inputted signal, in the display period Ts1.

The above operations are repeated for all of the subframe periods SF1 to SF4, one frame period F1 is completed. The length of the display periods Ts1 to Ts4 of the subframe periods SF1 to SF4 are set appropriately here, and gradations are expressed by an accumulation of the display periods of the subframe period during which the light emitting elements 2704 emit light. In other words, the total amount of the turn on time within one frame period is used to express the gradations.

A method of generally expressing $2^n$ gradations by inputting an n-bit digital video signal, is explained. One frame period is divided into n sub-frame periods SF1 to SFn at this point, for example, and the ratios of the lengths of the display periods Ts1 to Tsn of the sub-frame periods SF1 to SFn are set so as to be $Ts1:Ts2: \ldots :Tsn=2^0:2^{-1}:2^{-n+2}:2^{-n+1}$. Note that the lengths of the write-in periods Ta1 to Tan are all the same.

Within one frame period, the gradation of the pixels in the frame period is determined by finding the total of the display period Ts during which a light emitting state is selected in the light emitting element 2704. For example, if the brightness for a case in which a pixel emits light during all of the display periods is taken to be 100% when n=8, then a brightness of 1% can be expressed if the pixel emits light in the display period Ts8 and in the display period Ts7. A 60% brightness can be expressed for cases in which the pixel emits light in the display periods Ts6, Ts4, and Ts1.

A circuit to convert signals is needed in order to display in such time gradation method as shown above. Schematic of the conventional control circuit is shown in FIG. 2. A control circuit 200 is constituted by memories A201 and B202 for storing data, a logic circuit for reading data and writing into the memory (W-LOGIC 203), and a logic circuit for reading the memory and outputting data (R-LOGIC 204).

A timing chart of the conventional control circuit is shown in FIG. 3. Data is written and read alternately using memories A201 and B202, in order to make the digital data inputted to W-LOGIC 203 synchronize with a time gradation method.

When R-LOGIC204 reads a signal in the memory A201, a digital video signal for the next frame period is inputted to the memory B202 through W-LOGIC 203 and starts being stored.

In this way, the control circuit 200 includes the memories A201 and B202 which can store digital video signal of 1 frame period each, to sample a digital video signal by using them alternately.

Conventionally, however, there was a state of Wait until the next read signal occurred after writing into the memories A201 and B202. A switching function between writing and reading of the memories A201 and B202 was operated in timing with reading which takes more time. (FIG. 3)

SUMMARY OF THE INVENTION

In the conventional method, a time for reading was set much longer than a time for writing. Therefore there was no problem with a method in which a writing occurs as needed and operating functions are switched after reading.

However, there was a problem. In a driving method which has little difference between a time for reading and a time for writing of memory, a conventional method that there is a state of Wait until reading is done after writing pulled back the timing of writing to memory. As a result of this, a frame frequency decreases.

To solve the above-mentioned problem of related art, the present invention took the following method. Namely, by reading states of reading signal and writing signal at a certain timing, synchronization is taken and which one of two memories will be written to is decided through the signals.

Namely, by using a display device having:

a first memory and a second memory which store data;

a writing device which reads data and writes to the first memory and the second memory;

a reading device which reads data from the first memory or the second memory, and outputs data;

a means to decide the roles for writing and reading to the first memory and the second memory in accordance with the states of a writing device and a reading device; and a first memory selector and a second memory selector which select writing and reading to the first memory and the second memory;

the writing device and the reading device can be synchronized to solve the problem.

As a means to decide the roles for writing and reading to a first memory and a second memory from the states of a writing device and a reading device, a display device provides a circuit, wherein:

state of a writing device is denoted by a first signal and state of a reading device is denoted by a second signal;

a third signal decides the roles for writing and reading to a first memory and a second memory, and inverts to switch the roles of the first memory and the second memory when the first and second signals come into a second state;

a fourth signal holds the third signal;

said first and second memories are given the roles of writing and reading respectively;

the first signal is inputted to the reading device and the second signal is inputted to the writing device;

when the writing device is in a state of writing, the first signal and the second signal come into a first state, therefore, the third signal is not inverted and the fourth signal overwrites a state of the third signal;

when the writing device is in a waiting state, the first signal comes into the second state and the second signal also comes into the second state to invert the third signal, therefore, the roles of writing and reading of two memories are switched. Then the second signal returns to the first state again. The fourth signal is compared with the third signal, and a state of the first signal is returned to the first state at the time the state of the third signal changes and the writing device starts writing.

Then, the reading device and the writing device may be not only FPGAs but also LSIs. Furthermore, they may be constituted on the same substrate with the display device.

Thereby, even when there is little difference between the time for reading and writing to memories, the operating functions can be switched in the optimum period. The problem that the frame frequency decreases can thus be solved.

BRIEF DESCRIPTON OF THE DRAWINGS

DETAILED DESCRIPTION OF THE PREFERRED EMBODIMENTS

Figure 1:
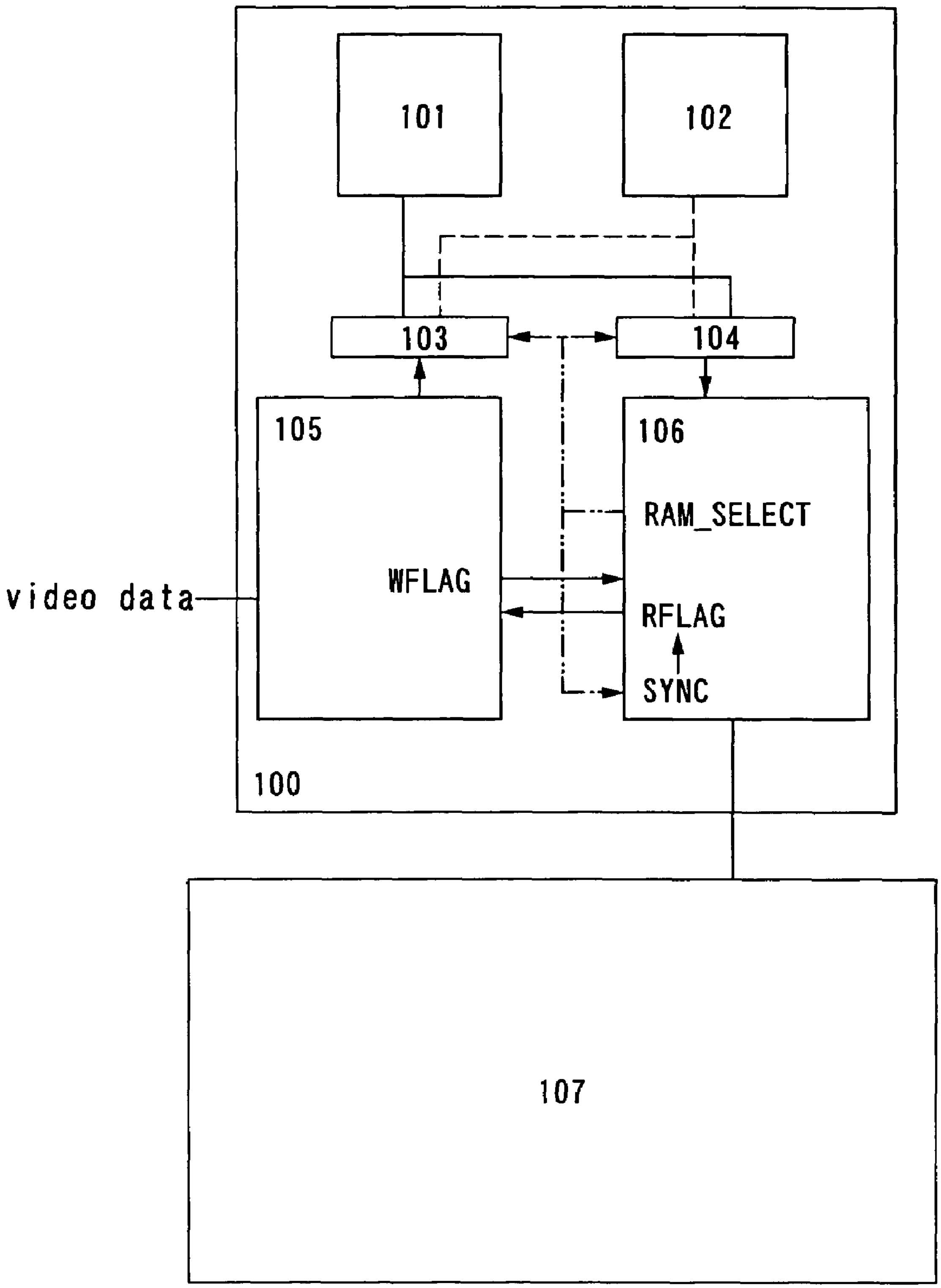
FIG. 1 is a block diagram of the present invention.
Figure 2:
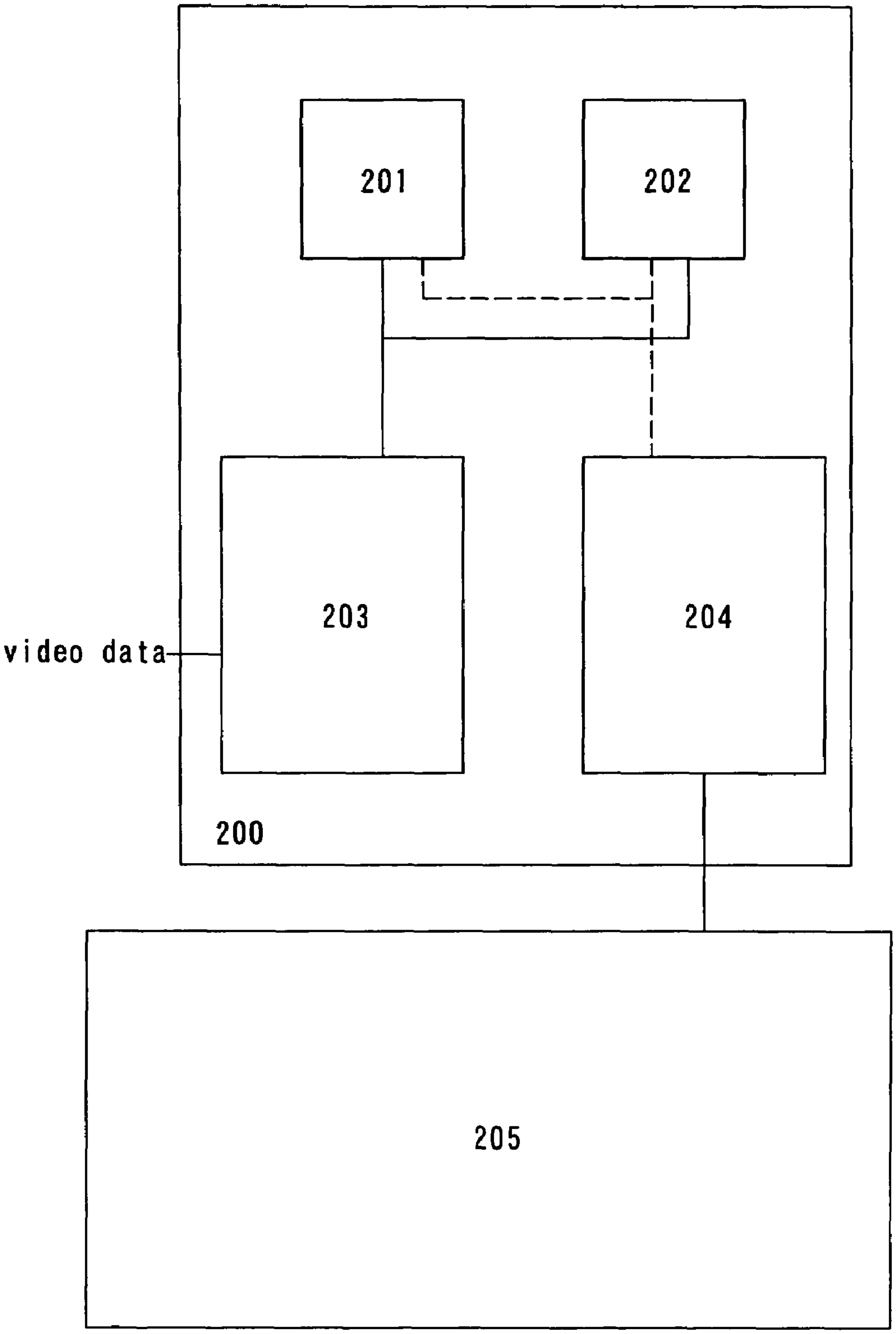
FIG. 2 is a block diagram of the conventional example.
Figure 3:
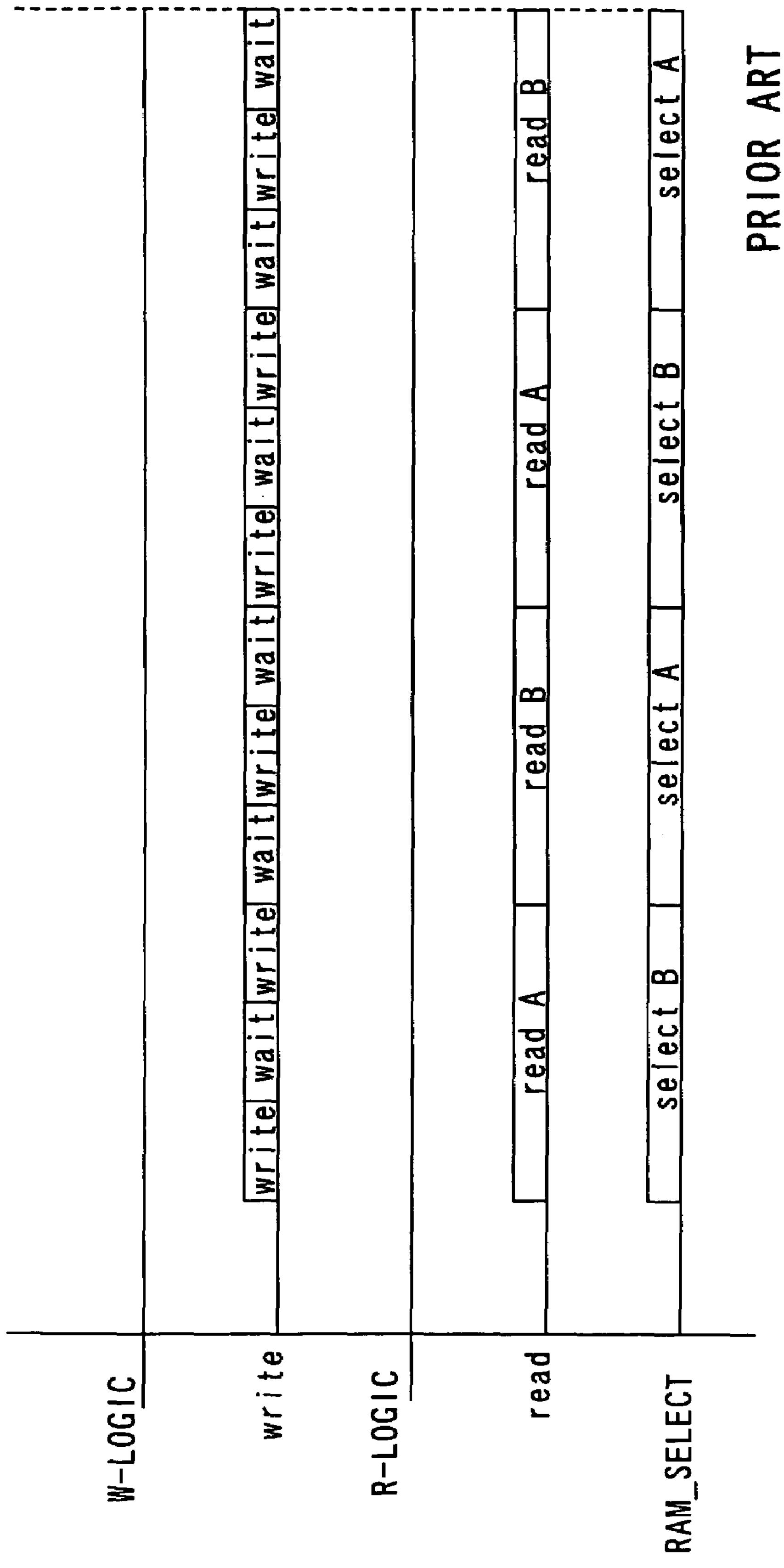
FIG. 3 is a timing chart of the operation of conventional example.

FIG. 1 shows a block diagram of a major structure of the present invention.

A control circuit 100 has memories A101 and B102, a Selector 103 for writing a memory, a Selector 104 for output, a logic circuit for writing into a memory (W-LOGIC 105), and a logic circuit for reading the memory and outputting the data (R-LOGIC 106). When video data is inputted to W-LOGIC 105, it writes data in either of memories A101 or B102 selected by the Selector 103 for writing memory. Then the Selector 104 selects the other memory which was not selected by the Selector 103 as a memory for R-LOGIC 106 to read.

Signals of SYNC, WFLAC, RFLAG and RAM_SELECT are newly adopted to achieve a synchronization. W-LOGIC 105 inputs the writing state WFLAG to R-LOGIC 106, and the reading state RFLAG from memory is inputted to W-LOGIC 105 as needed. RAM_SELECT selects a memory to write in accordance with each state of WFLAG and RFLAG. R-LOGIC 106 holds RAM_SELECT and makes a comparison with the RAM_SELECT of the moment when SYNC is inputted.

In the structure in FIG. 1, R-LOGIC 106 holds RAM_SELECT particularly, however, W-LOGIC 105 may hold RAM_SELECT as well.

Figure 4:
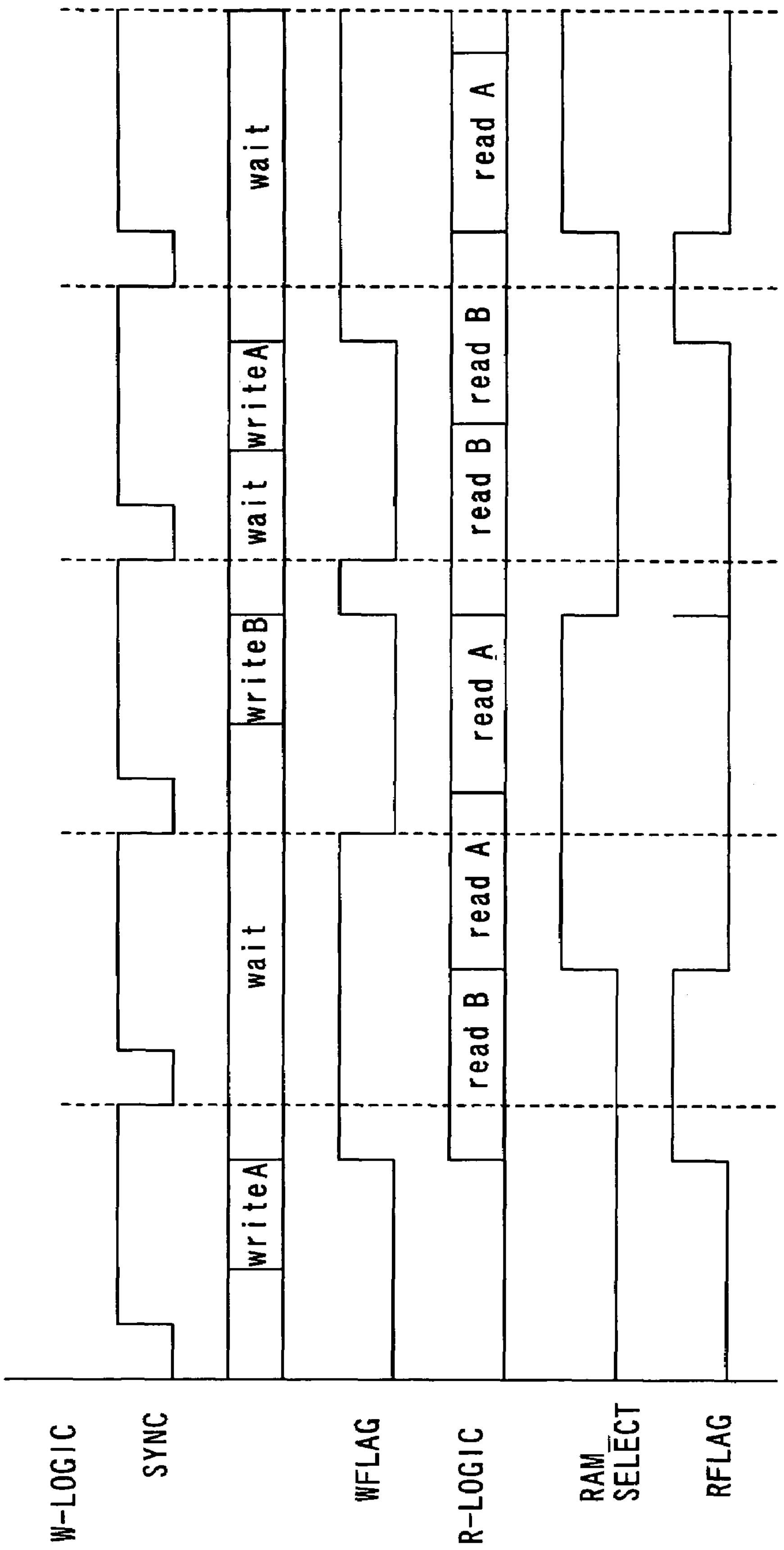
FIG. 4 is a timing chart of the operation of the present invention.

A timing chart of the operations of W-LOGIC 105 and R-LOGIC 106 is shown in FIG. 4.

WFLAG is Low when W-LOGIC 105 is in Write state and RFLAG also becomes Low when Low of WFLAG is inputted to R-LOGIC 106.

WFLAG is High when W-LOGIC 105 is in the state of Wait, and when High of WFLAG is inputted to R-LOGIC 106, RFLAG becomes High as well. RFLAG becomes Low when both WFLAG and RFLAG are High and R-LOGIC 106 finishes reading data from the memory selected by the Selector 104 for output. In timing with RFLAG becoming Low, RAM_SELECT is inverted and the memory selected by the Selectors 103 and 104 switches.

When SYNC is inputted, RAM_SELECT at that point is compared with the RAM_SELECT stored in R-LOGIC 106. During a Wait period, the RAM_SELECT is inverted and WFLAG becomes Low when the state of the inverted RAM_SELECT is different from the RAM_SELECT stored in R-LOGIC 106, and again W-LOGIC 105 becomes Write state.

Figure 5:
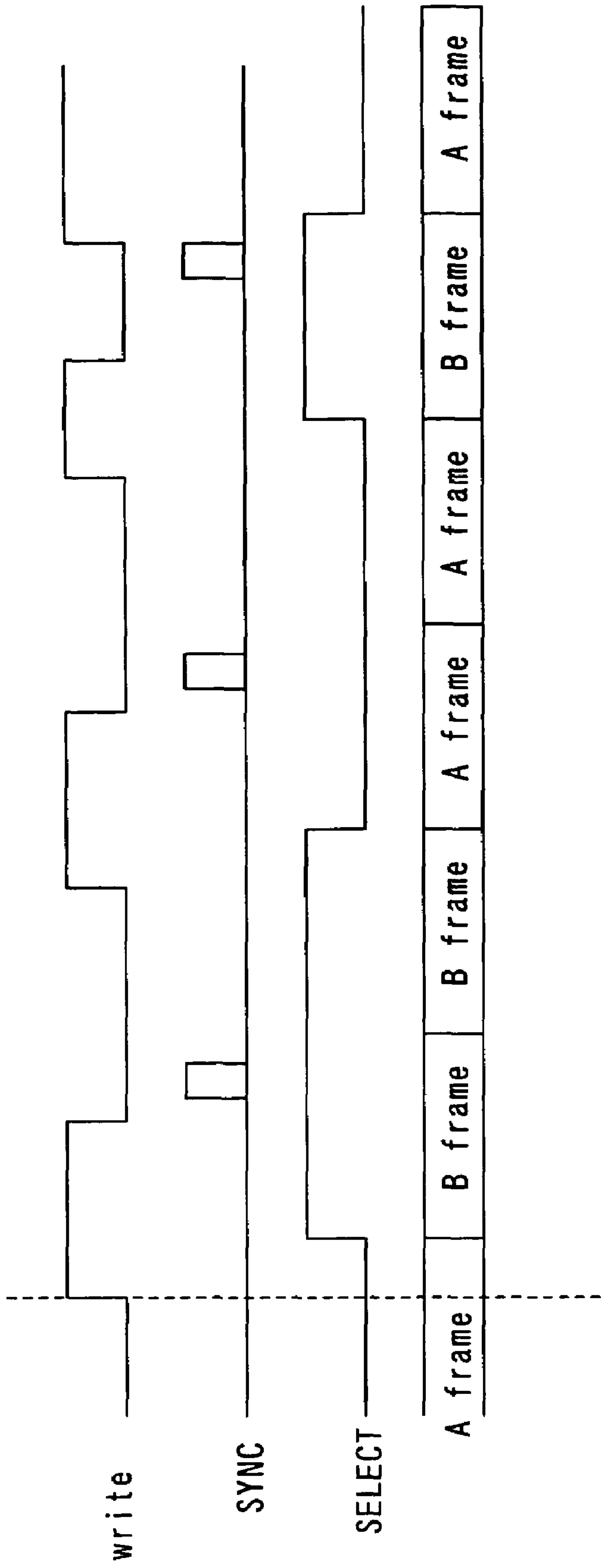
FIG. 5 is a timing chart of the operation of the present invention.

In FIG. 5, a timing chart regarding the synchronization and the timing of writing and reading is shown. When SYNC is inputted, R-LOGIC 106 writes the state of the RAM_SELECT. During a Write (WFLAG is Low) period, a new state of RAM_SELECT is overwritten, and the state is kept during a Wait (WFLAG is High) period.

Furthermore, when inverted RAM_SELECT during Wait period is different in state from RAM_SELECT stored in R-LOGIC 106, WFLAG becomes Low and again W-LOGIC 105 becomes Write state.

As RFLAG is Low when RAM_SELECT is inverted, writing and reading can be synchronized at this point.

Embodiments of the invention will be described.

EMBODIMENT 1

Figure 6:
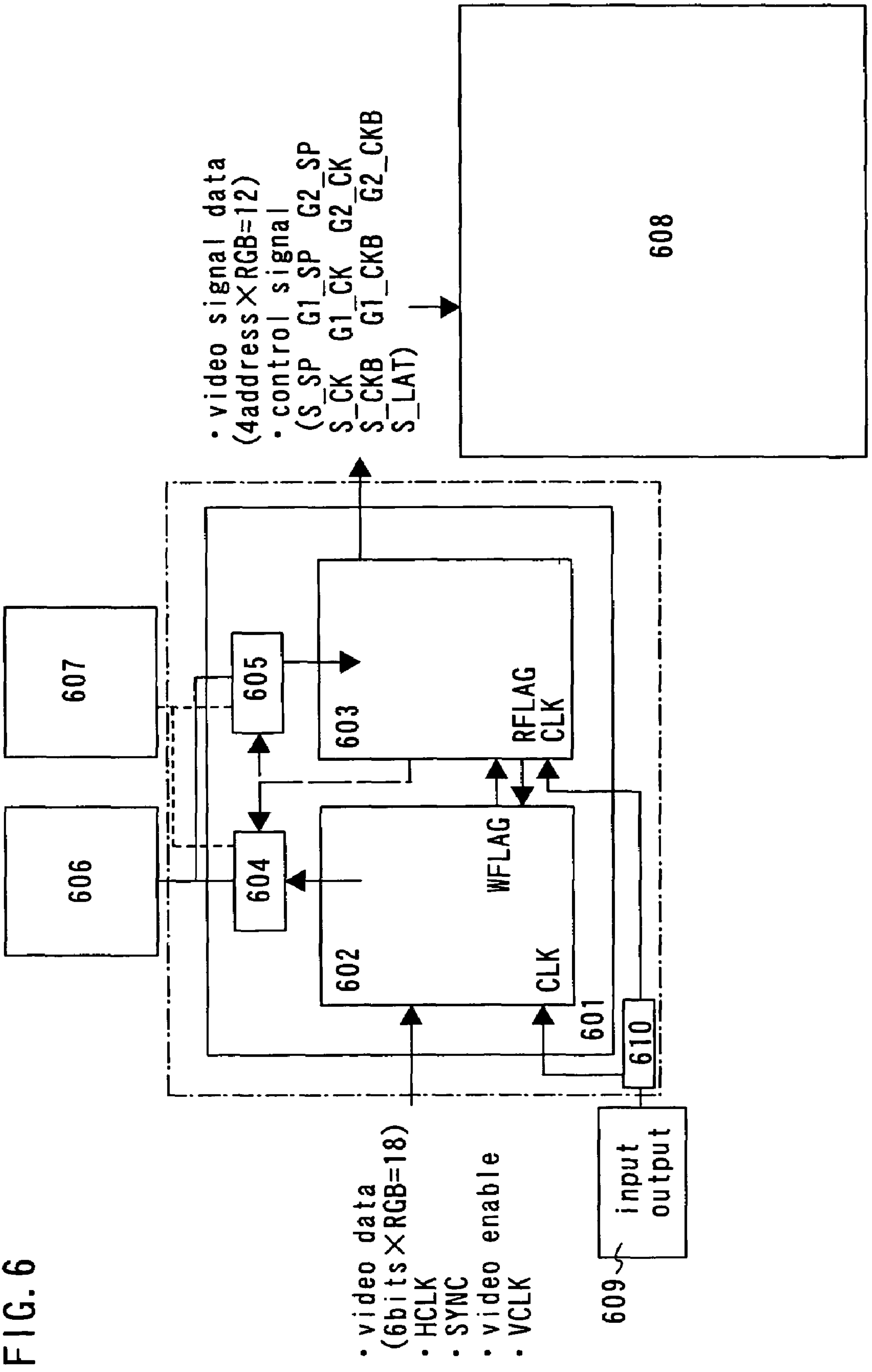
FIG. 6 is a diagram showing an embodiment using the present invention.

In this embodiment, an example of the constitution of a control circuit which outputs to a display for displaying using OLED elements referring to FIG. 6.

18 bits (6 bits×RGB) of Video_Data and control signals are inputted to a control circuit 601. The operation from the input of Video_Data to the output to a display 608 is described.

Reading of each line is controlled by VCLK (a cycle is 148.8 μs). First, the input of Video_Data starts by being inputted a SYNC signal. After being inputted a SYNC signal and a certain period of off time passes, the input of Video_Data to W-LOGIC 602 starts. One line of Video_Data is read per half cycle of VCLK. After inputting 220 lines and a certain period of off time passes, a SYNC signal is inputted again, and Video_Data is inputted. An input cycle for full page is 18.1536 ms (122 cycles of VCLK).

Reading to each block in one line is controlled by HCLK (a cycle is 400 ns). HCLK reads Video_Data during Video_Enable is high. After reading one line, more specifically, 176 blocks of data, and a certain period of off time (Video_Enable is Low) passes, then reading the next line of Video_Data. By repeating this for 220 lines, data for one screen is completed.

On the other hand, a memory A606 and a memory B607 are connected to the control circuit 601, and a signal RAM_SELECT from the control circuit 601 decides which memory is written and read. Each memory is constituted of 24 (8×3) flip flops. Each flip-flop can store data (6 bits) for one color at a certain point. Data is moved to next flip flop sequentially by HCLK. When the memory has eight blocks of data, one memory is selected for writing and the other memory is selected for reading data in accordance with a value of RAM_SELECT. After finishing a cycle of reading data, and receive data, RAM_SELECT is switched.

Because the display on a display 608 is done by time gradation, data written to the memory A606 or the memory B607 are changed their orders for the output to the display and sequentially outputted to the display 608. R-LOGIC 603 takes data for 8 blocks into the memory A606 and the memory B607, followed by reading the first period of 1 to 4 blocks, the first period of 5 to 8 blocks, the second period of 1 to 4 blocks, the second period of 5 to 8 blocks . . . up to the sixth period in this order, and outputs them to the display 608.

In displaying on the display 608, Video_Data is processed in 12 bits (4×RGB). G1_CK, G2_CK, G1_CKB, G2_CKB are clocks whose cycles are 12 μs each. In timing wit G1_CK and G1_CKB rising or dropping, the row where Video_Data is inputted moves.

After 2 cycles after G1_SP drops, writing is done from the top row in sequence. Writing 220 lines makes a display for one screen, however, 4 dummy cycles (48 μs) come into to delay writing before displaying the next image. G2_SP is risen in cleaning the writing, as needed.

S_CK and S_CKB are clocks whose cycles are 200 ns each. In timing with S_CK and S_CKB rising or dropping, the block where Video_Data is inputted moves. After 4 cycles (800 ns) after rising or dropping of G1_CLK, S_LAT becomes High to hold an electric charge, and then when S_SP changes from High to Low, the input of Video_Data starts. As input is done every 4 blocks, repeating it 44 times completes writing for one line.

Inputting clocks from an oscillation element 609 through PLL 610 take synchronization between W-LOGIC 602 and R-LOGIC 603. The timing of writing and reading to the memory A606 and the memory B607 is controlled by the rise and drop of the clocks through PLL 610.

Known LSI as well as FPGA may be used for W-LOGIC 602 and R-LOGIC 603.

The invention is used for W-LOGIC 602, R-LOGIC 603, the memory A606, the memory B607, and Selectors 604 and 605 which select memory.

EMBODIMENT 2

Figure 7:
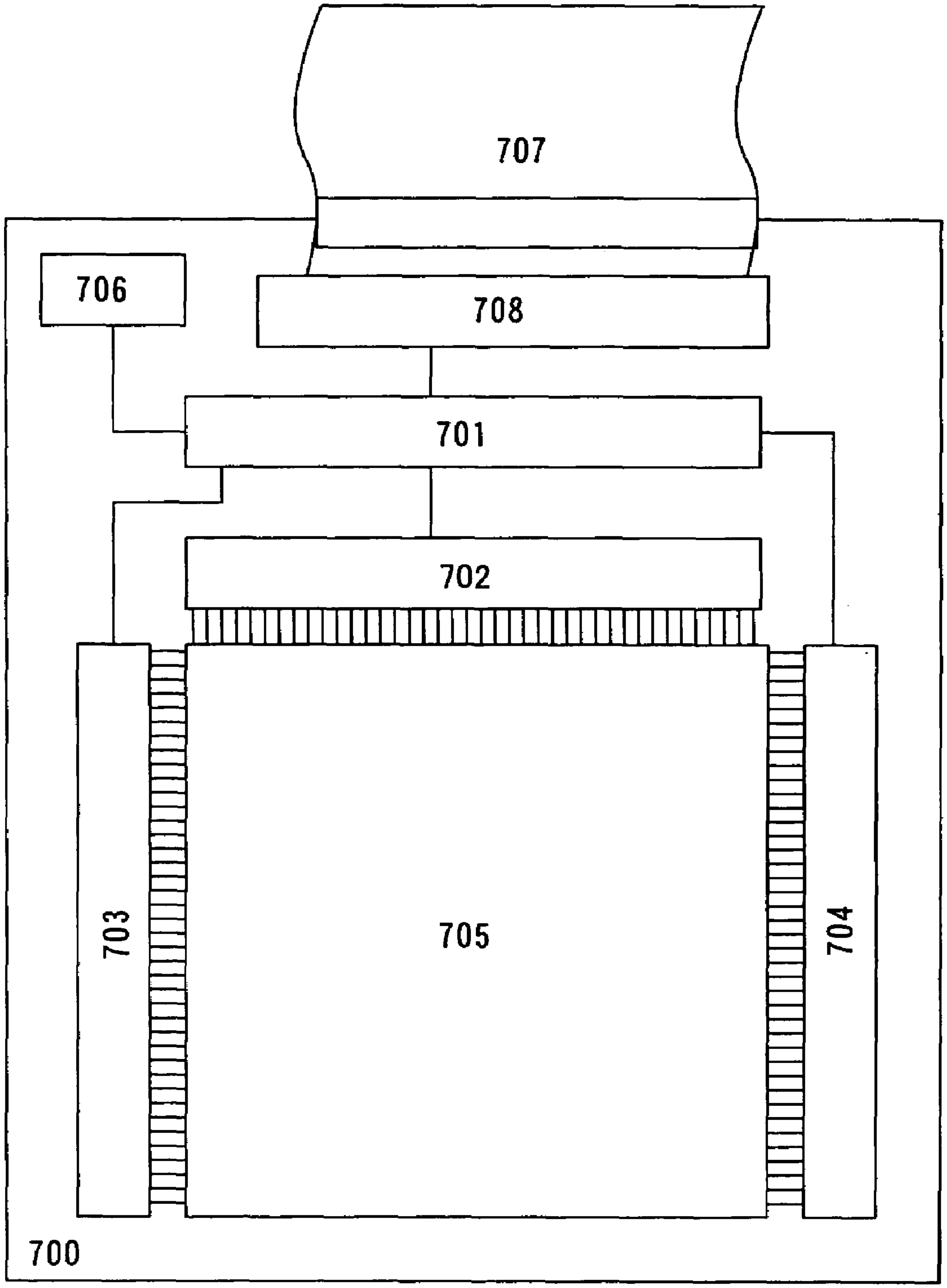
FIG. 7 is a diagram showing an example of a display device using the present invention.
Figure 8:
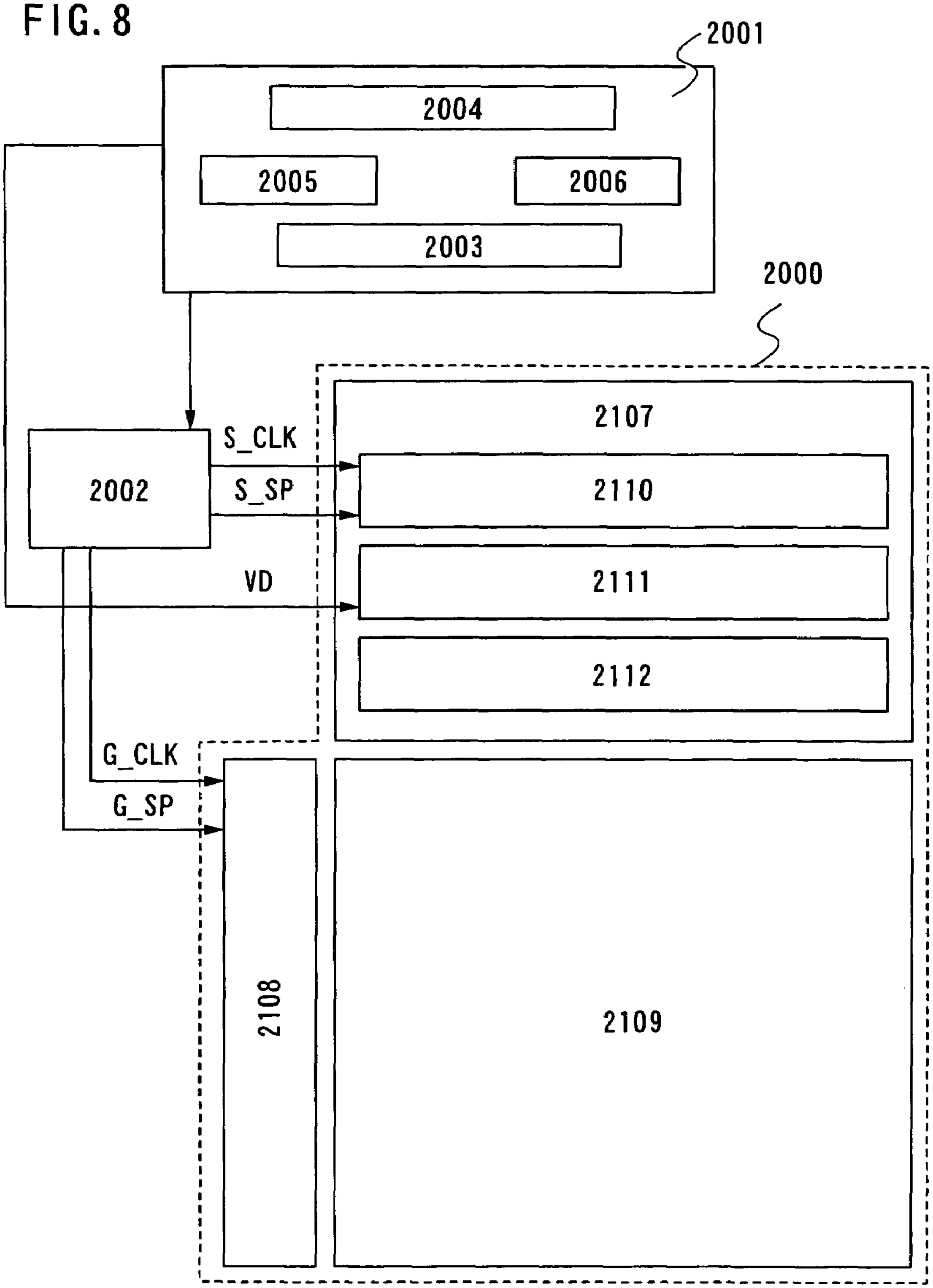
FIG. 8 is a block diagram of the conventional example.
Figure 9:
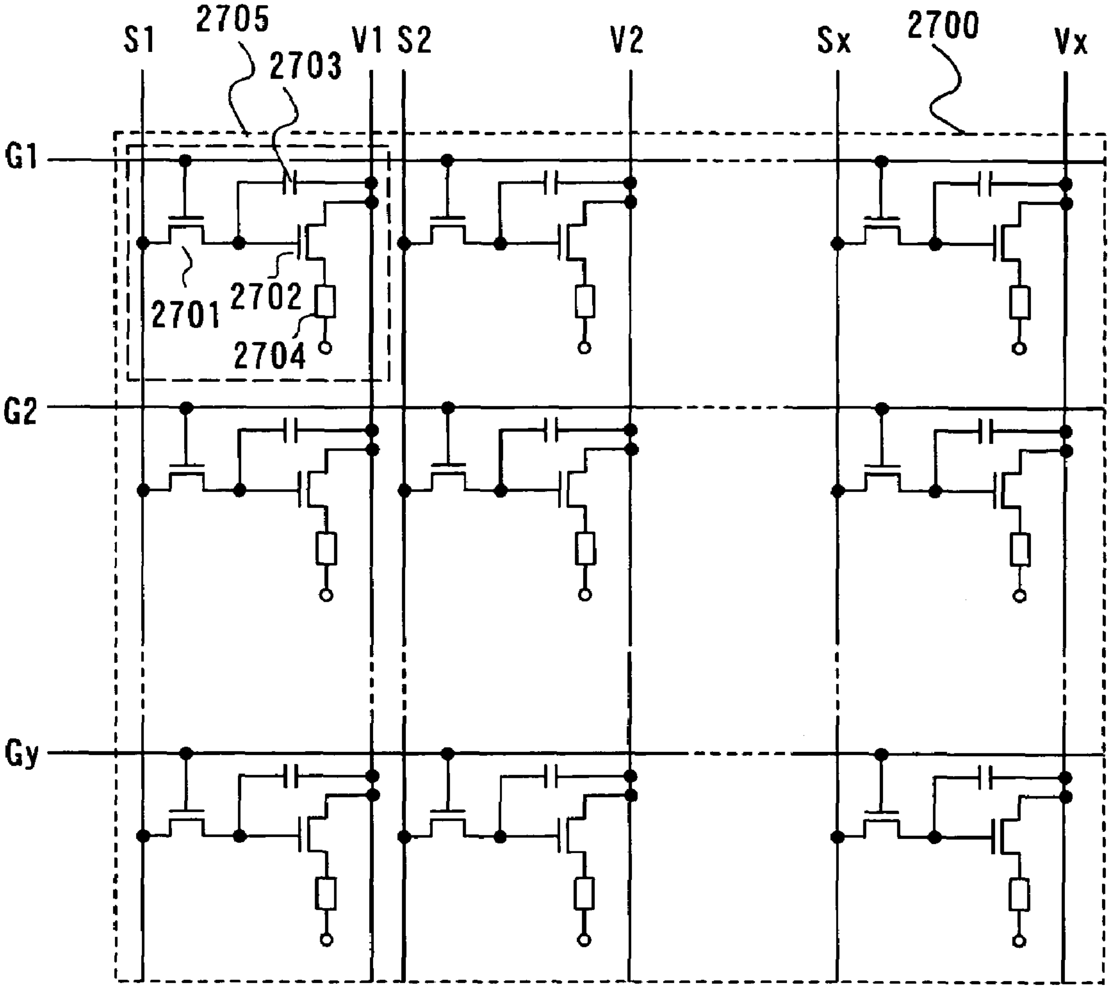
FIG. 9 is a circuit diagram of the pixels disposed in a matrix shape.
Figures 10A, 10B:
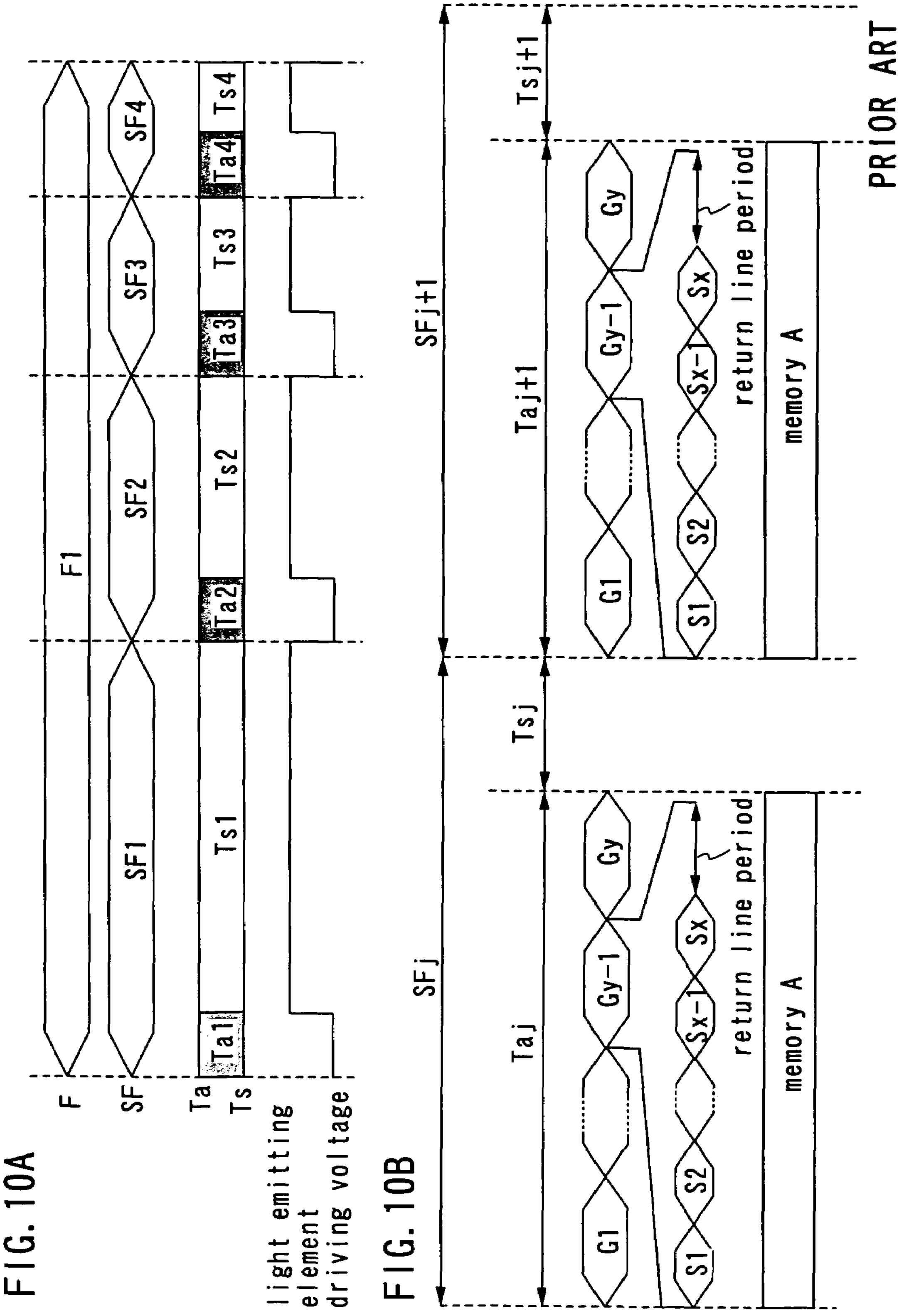
FIGS. 10A and 10B are timing charts of the operation of the conventional example.

In FIG. 7, an example of a display device using OLED elements with a control circuit of the embodiment 1 is shown.

A display device is constituted by a panel 700, a control circuit 701, a source signal line driving circuit 702, a gate signal line driving circuits 703 and 704, a display portion 705, an SRAM 706, an FPC 707, and a connector 708. Each circuit of the display device is formed over the panel 700, otherwise attached externally.

Operation of the display device is now described. Data and a control signal sent from the FPC 707 through the connector 708 are inputted to the control circuit 701 and the data are rearranged for output in SRAM 706, and then sent to the control circuit 701 again. The control circuit 701 sends signals for data and display to the source signal line driving circuit 702 and the gate signal line driving circuits 703 and 704, and then image is displayed at the display portion 705 using OLED elements.

The source signal line driving circuit 702 and the gate signal line driving circuits 703 and 704 can be substituted for the known circuits. Furthermore, the gate signal line driving circuit can be reduced to one depending on the structure of the circuit.

The invention is applied to the control circuit 701.

EMBODIMENT 3

Figure 13:
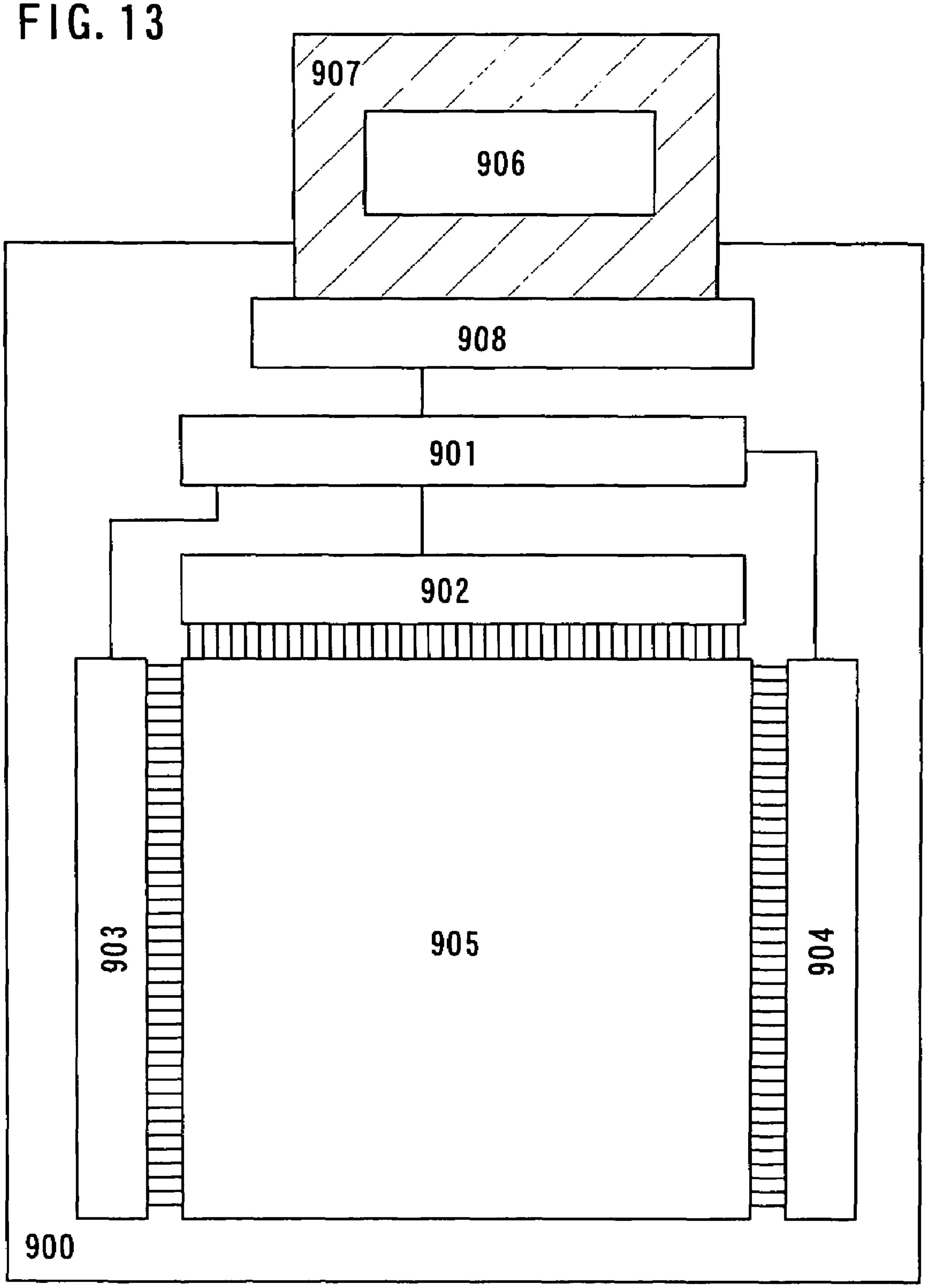
FIG. 13 is a diagram showing an example of a display device using the present invention.

In this embodiment, an example of the display device using OLED elements with a control circuit of the embodiment 1 which is different from the embodiment 2 is described in FIG. 13.

A panel 900 is constituted by a control circuit 901, a source signal line driving circuit 902, a gate signal line driving circuits 903 and 904, a display portion 905, an SRAM 906, an FPC 907, and a connector 908. Each circuit of the display device is formed over the panel 900, otherwise attached externally.

Operation of the display device is now described. Data and a control signal sent from the FPC 907 through the connector 908 are inputted to the control circuit 901 and their data are returned to the SRAM 906 in the FPC 907, and then rearranged for output and sent to the control circuit 901 again. The control circuit 901 sends signals used for data and display to the source signal line driving circuit 902 and the gate signal line driving circuits 903 and 904, and then display of the picture image is performed at the display portion 905 using OLED elements.

The difference with the embodiment 2 is that the SRAM 906 is incorporated in the FPC 907. Display device can be made smaller thereby.

As with the embodiment 2, the source signal line driving circuit 902 and the gate signal line circuits 903 and 904 can be substituted for the known circuits. Furthermore, the gate signal line driving circuit can be reduced to one depending on the structure of the circuit.

The invention is applied to the control circuit 901.

EMBODIMENT 4

Figure 11:
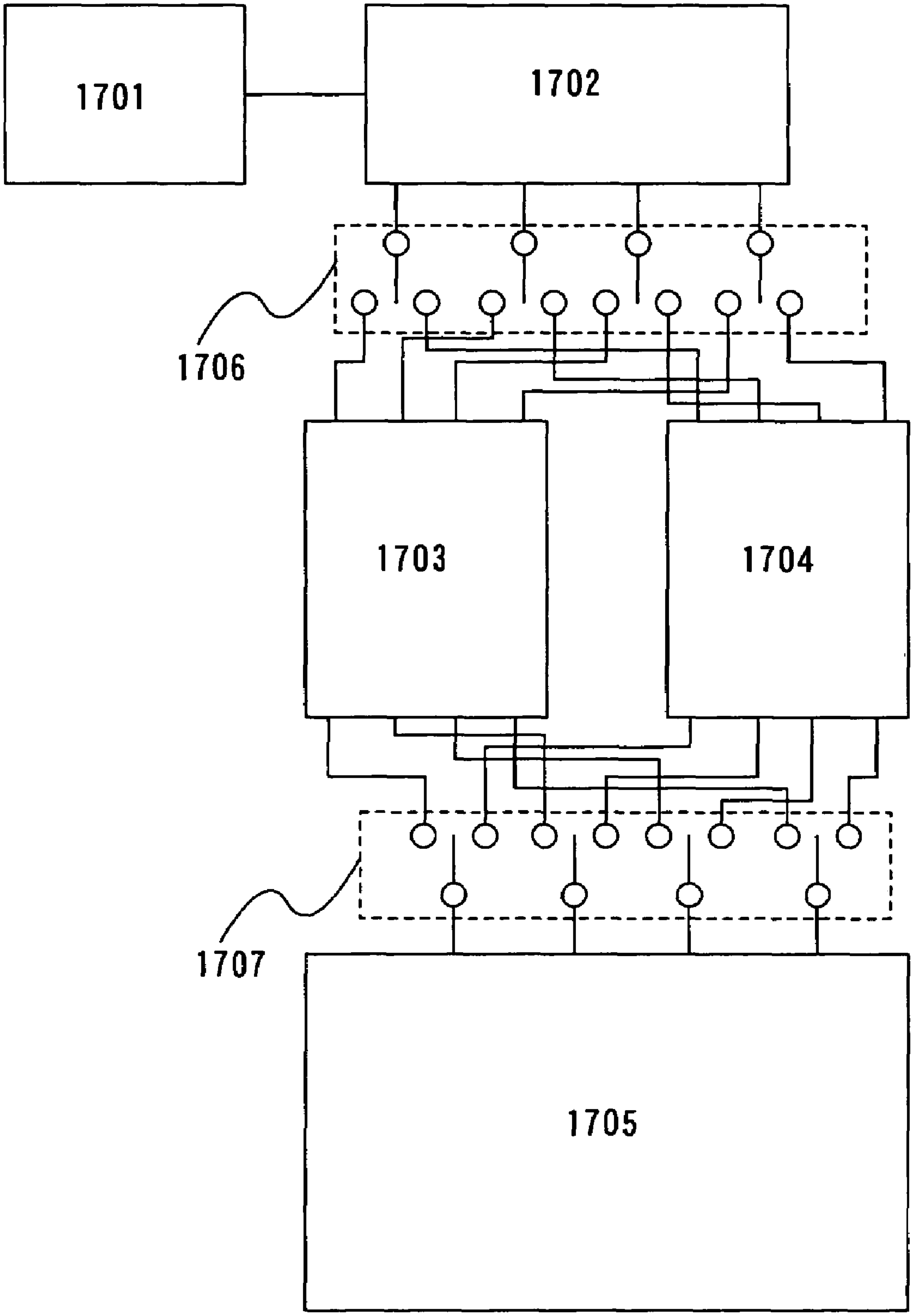
FIG. 11 is a diagram showing an example of a display device using the present invention.

In this embodiment, an example of the control circuit for output to the display using OLED elements having the different structure from the embodiments 1 to 3 is described referring to FIG. 11.

Time gradation method display naturally takes more operating frequencies compared with an analog display. In order to achieve a high image quality, pseudocontour needs to be avoided and subframe needs to be increased to 10 or more. Therefore, operating frequency also needs to be decupled or more.

To drive the device with such an operating frequency, SRAM needs a high speed operation using an SRAM-IC for high speed operation.

SRAM for high speed operation, however, consumes rather big power when storing, so that it is not appropriate for mobile devices. In order to use an SRAM of low-power-consumption, frequency needs to be more decreased.

As shown in FIG. 11, a serial-parallel conversion circuit 1702 is constituted which changes data from serial to parallel before writing digital image signals to SRAMs 1703 and 1704. Writing is made through a Switch 1706 thereafter.

By taking such a measure, parallel calling can be made with low frequency. Hence, a low-power-consumption SRAM can be used with low frequency to achieve the low power consumption of mobile devices.

EMBODIMENT 5

The invention may be applied to electric devices such as a video camera, a digital camera, a goggle display (head mount display), a navigation system, a sound reproduction device (car audio, audio component and the like), a laptop personal computer, a game device, a Personal Digital Assistant (mobile computer, mobile phone, portable game device or a digital book and the like), picture reproducer with recording medium (specifically a device with a display which plays the recording medium such as Digital Versatile Disc (DVD) and display the images) and the like. Examples of those electric devices are shown in FIG. 12.

Figure 12A:
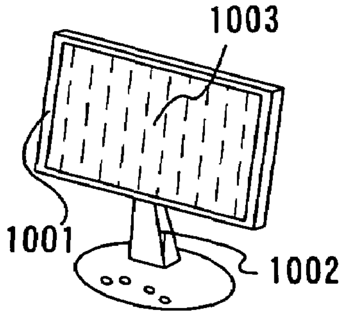
FIGS. 12A to 12G are diagrams showing electric devices using the present invention.

FIG. 12(A) illustrates a liquid crystal display or an OLED display constituted by a case 1001, a stand 1002, a display portion 1003 and the like. The present invention can be applied to a driving circuit of the display device having the display portion 1003.

Figure 12B:
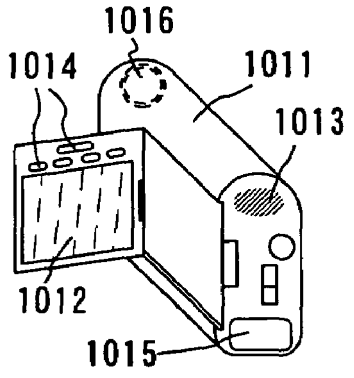

FIG. 12(B) illustrates a video camera constituted by a main body 1011, a display portion 1012, an audio input portion 1013, operating switches 1014, a battery 1015, an image receiving portion and the like. The present invention can be applied to a driving circuit of the display device having the display portion 1012.

Figure 12C:
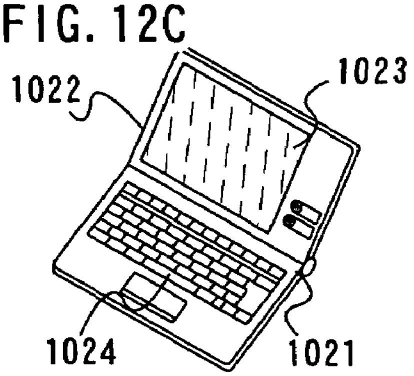

FIG. 12(C) illustrates a laptop personal computer constituted by a main body 1021, a case 1022, a display portion 1023, a keyboard 1024 and the like. The present invention can be applied to a driving circuit of the display device having the display portion 1023.

Figure 12D:
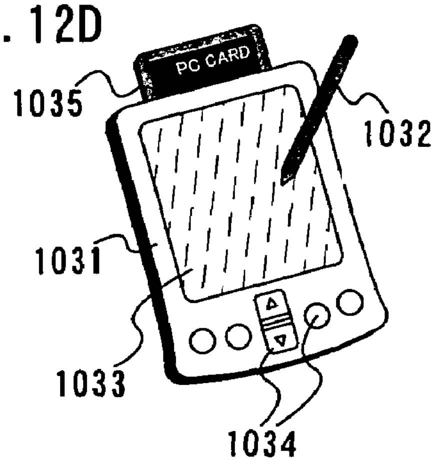

FIG. 12(D) illustrates a Personal Digital Assistant constituted by a main body 1031, a stylus 1032, a display portion 1033, operating buttons 1034, an external interface 1035 and the like. The present invention can be applied to a driving circuit of the display device having the display portion 1033.

Figure 12E:
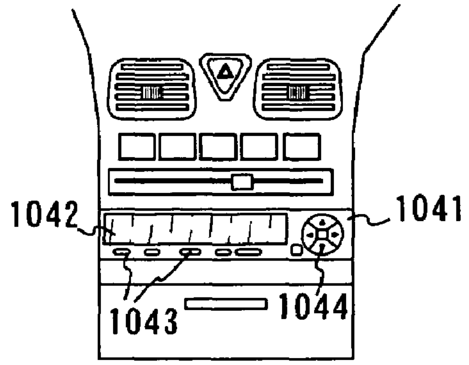

FIG. 12(E) illustrates a sound reproduction device, especially an audio device mounted in a motor vehicle constituted by a main body 1041, a display portion 1042, operating switches 1043 and 1044 and the like. The invention can be applied to a driving circuit of the display device including the display portion 1042. Furthermore, the invention can be applied to any of portable or home audio devices other than the above-described audio device mounted in a motor vehicle.

Figure 12F:
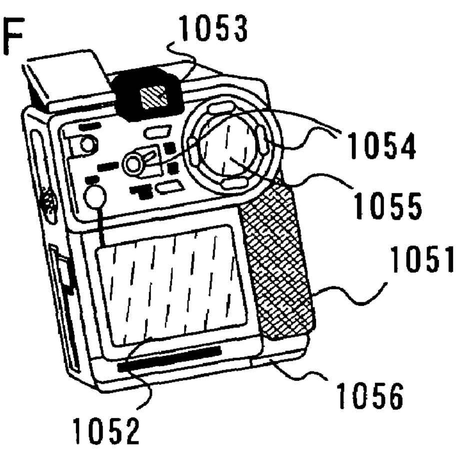

FIG. 12(F) illustrates a digital camera constituted by a main body 1051, a display portion (A)1052, an ocular portion 1053, operating switches 1054, a display portion (B) 1055, a battery 1056 and the like. The present invention can be applied to a driving circuit of the display device having the display portions (A) 1052 and (B) 1055.

Figure 12G:
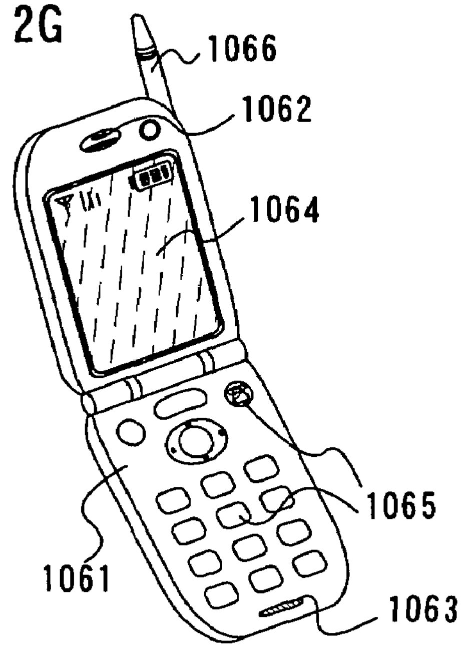

FIG. 12(G) illustrates a mobile phone constituted by a main body 1061, an audio output portion 1062, an audio input portion 1063, a display portion 1064, operating switches 1065, an antenna 1066 and the like. The present invention can be applied to a driving circuit of the display device having the display portion 1064.

A plastic substrate with high heat resistance other than a glass substrate can also be applied to the display device of these electronic devices. Further weight saving can be achieved thereby.

It is to be noted that the above-described devices of this embodiment are only examples and that the invention is not exclusively applied to them.

This embodiment can be freely combined with the embodiment mode as well as any of embodiments 1 to 4.

In the case of the display device with light emitting elements, the reduction of frame frequency can be prevented by switching writing and reading efficiently by utilizing the control circuit of the invention.

What is claimed is:

1. A driving method for a display device having a light emitting element, a first memory, a second memory, a writing circuit, a reading circuit and a selector circuit, the method comprising the steps of:

inputting a first signal into the reading circuit;

inputting a second signal into the writing circuit;

inputting a third signal into the selector circuit;

starting to write a second video data to one of the first memory and the second memory when the first signal and the second signal are in a first state;

setting the first signal and the second signal to a second state after the second video data is written to one of the first memory and the second memory;

setting the second signal to the first state after a first video data is read from the other of the first memory and the second memory;

changing a state of the third signal between a third state and a fourth state when the first signal is in the second state and the second signal is in the first state; and setting the first signal to the first state after changing the state of the third signal, wherein the selector circuit selects the first memory as a memory for writing and selects the second memory as a memory for reading when the third signal is the third state, and selects the second memory as the memory for writing and selects the first memory as the memory for reading when the third signal is the fourth state, and wherein light or non-light of said lighting element is controlled by a video data.

2. A display device comprising:

a light emitting element;

a first memory;

a second memory;

a selector circuit which selects one of the first memory and the second memory as a memory for writing and selects other of the first memory and the second memory as a memory for reading;

a reading circuit which reads a video data from a memory for reading; and a writing circuit which writes the video data to a memory for writing and enters a wait state after writing is finished, wherein a pulse of a constant period is input into the writing circuit, wherein the start of writing of the writing circuit is controlled based on the pulse after revision of a selection by the selector circuit, and wherein light or non-light of the lighting element is controlled by the video data.

3. A display device according to claim 2, wherein the light emitting element, the first memory, the second memory, the selector circuit, the reading circuit and the writing circuit are formed over a substrate altogether.

4. A display device according to claim 2, wherein said memory is implemented over a substrate.

5. The display device according to claim 2, wherein the display device is incorporated in an electronic device selected from the group consisting of a video camera, a digital camera, a goggle display, a navigation system, a sound reproduction device, a laptop personal computer, a game device, a personal digital assistant and picture reproducer.

6. A driving method for a display device having a light emitting element, a first memory, a second memory, a writing circuit and a selector circuit, wherein the selector circuit selects one of the first memory and the second memory as a memory for writing and selects the other of the first memory and the second memory as a memory for reading and writes video data to the first memory and the second memory alternately, the method comprising the steps of:

inputting a pulse having a constant period into the writing circuit;

writing a second video data to the memory for writing;

setting the writing circuit to a wait state after the second data is written to the memory for writing;

changing selection of the selector circuit after reading a first video data from the memory for reading when the writing circuit is in a wait state; and starting to write a third video data to the memory for writing based on a pulse having a constant period received after changing selection of the selector circuit, wherein light or non-light of the lighting element is controlled by the video data.

7. A driving method for a display device having a light emitting element, a first memory, a second memory and a writing circuit, where video data is written to the first memory and the second memory alternately, the method comprising the steps of:

inputting a pulse having a constant period into the writing circuit;

writing a second video data to one of the first memory and the second memory;

setting the writing circuit to a wait state after the second data is written to one of the first memory and the second memory; and starting to write a third video data to other of the first memory and the second memory after a first video data is read from other of the first memory and the second memory and the pulse is input into the writing circuit in the wait state, wherein light or non-light of the lighting element is controlled by the video data.

* * * * *